United States Patent Office 3,201,201
Patented Aug. 17, 1965

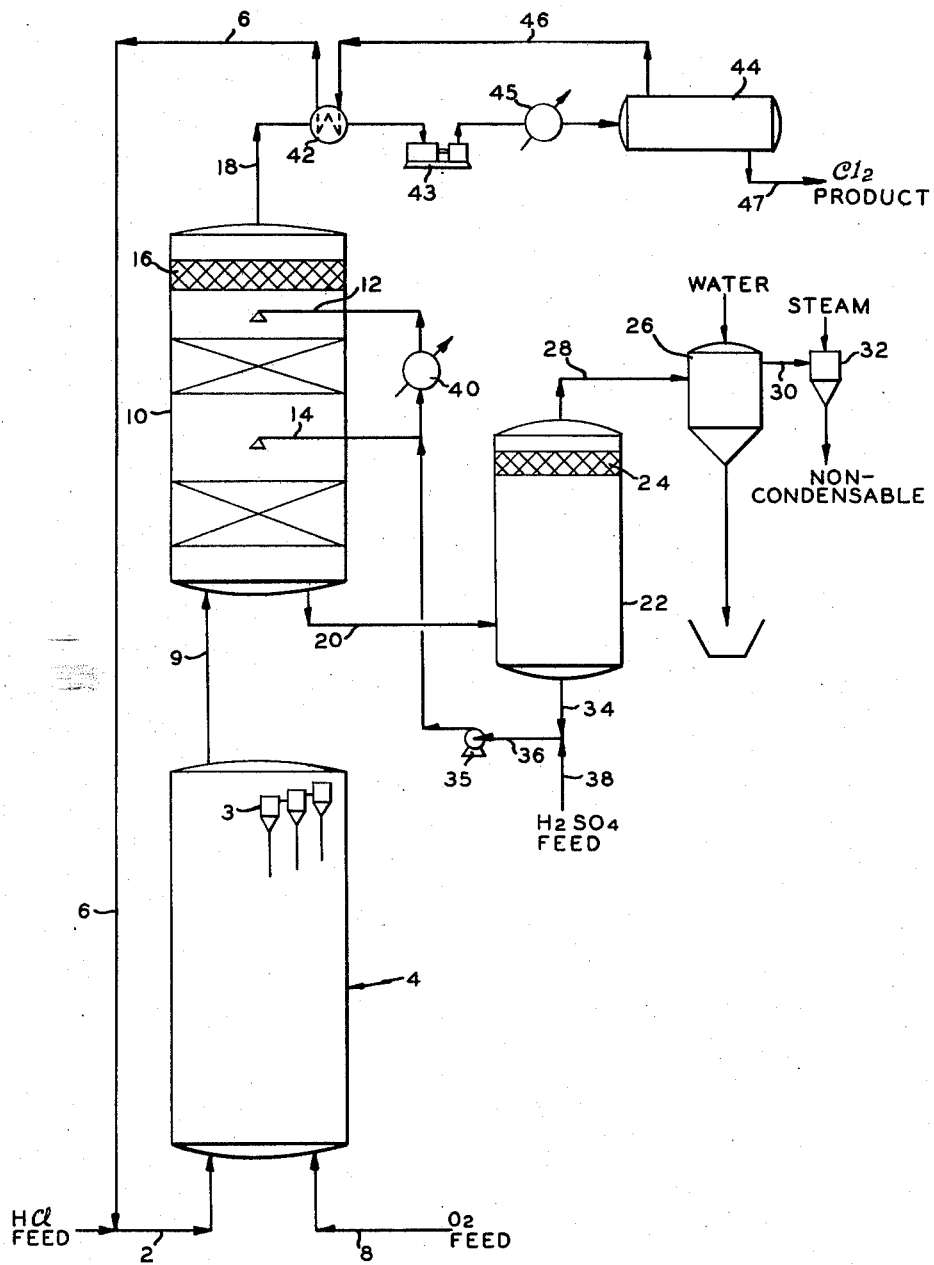

3,201,201
PROCESS FOR TREATING THE EFFLUENT GAS OBTAINED BY THE OXIDATION OF A HYDROGEN HALIDE GAS
Christiaan P. van Dijk and William G. Hudson, Westfield, N.J., assignors to Pullman Incorporated, a corporation of Delaware
Filed June 1, 1962, Ser. No. 199,330
14 Claims. (Cl. 23—219)

This invention relates to a process wherein halogen is produced by the interaction of oxygen and a hydrogen halide and the method for treating the reaction effluent. The invention relates more particularly to a process wherein oxygen and hydrogen halide are reacted in the presence of a catalyst and the effluent of the reaction is dried to provide a mixture containing halogen product in which corrosiveness of the mixture is reduced to a minimum. One particular aspect of the invention relates to a process wherein chlorine is produced in the presence of a catalyst and the corrosiveness of the mixture containing chlorine is reduced to a minimum by drying the mixture in an improved process. Another aspect of the invention relates to the production of chlorine wherein chlorine is separated from the reactor effluent by an improved method of treating.

Since hydrogen chloride is produced as a by-product in a great number of commercial processes and since the operation of many other processes is dependent upon the availability of a supply of chlorine where by-product hydrogen chloride is readily obtainable, methods providing for the efficient conversion of hydrogen chloride to chlorine have achieved primary importance. One of the most commonly employed methods of converting hydrogen chloride to chlorine is known as the Deacon process which involves contacting hydrogen chloride in admixture with oxygen, or an oxygen-containing gas, in the presence of a metal chloride or metal oxide of variable valence, such as copper chloride or chromium oxychloride at an elevated temperature. This reaction results in the production of chlorine and water according to the equation:

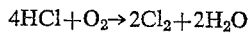

$$4HCl + O_2 \rightarrow 2Cl_2 + 2H_2O$$

These methods of producing halogen have met with difficulties in the manner and method of drying and separating the product gases. The halogen gas is obtained in admixture with water and unconverted hydrogen halide and these mixtures are, therefore, highly corrosive. For this reason, it is essential that water be removed as soon as possible from the reactor effluent, otherwise special acid-resistant equipment must be used in subsequent separation steps which is detrimental to the economics and efficiency to the process. Many methods have been tried in an attempt to remove the water from the reactor effluent by a hygroscopic agent such as sulfuric acid, but these methods have proved commercially unfeasible due to the highly corrosive nature of the hygroscopic media coupled with the prohibitive heat exchange requirements of such processes. Other methods involve the use of corrosive chemicals such as solutions of calcium chloride, etc. Further disadvantages associated with such methods of drying which include high heat exchange requirements in the systems wherein they are employed, lead to frequent replacement of expensive equipment such as the heat exchange apparatus.

It is, therefore, an object of the present invention to provide a process enabling more efficient and economical treatment of the reactor effluent from a hydrogen halide oxidation process, which process is suitable for commercial application.

Another object of this invention is to provide a method for simultaneous cooling and drying of reactor effluent containing halogen gas by commercially feasible and economical process.

Another object is to provide a method for efficient drying of a gaseous reaction mixture containing halogen in the absence of heat exchange equipment.

Still another object is to provide for the recovery of a dry product gas from a reactor effluent containing chlorine.

These and other objects will become apparent to those skilled in the art from the accompanying description and disclosure.

According to this invention, the effluent from the reaction between oxygen and hydrogen halide is dried by contacting, preferably by countercurrent contact, the effluent under adiabatic conditions with a hygroscopic agent such as a hygroscopic halide and/or sulfuric acid in aqueous solutions. After drying, the halogen-containing effluent, or product gas mixture, may be used as such as in the bleaching of paper pulp which can be performed with mixtures of chlorine, hydrogen chloride and oxygen, or the halogen can be recovered from the dried effluent mixture by any convenient method, e.g., subjecting the mixture to cooling in order to condense halogen from the hydrogen halide and other compounds of the mixture. The hygroscopic agent containing sorbed water and at least the heat of sorption, together with the heat of reaction when the effluent gases are cooled in the drying zone, is removed from the contactor or drying zone and regenerated under adiabatic conditions by flashing in one or more stages under reduced pressure while utilizing the increased heat content of the spent hygroscopic mixture to effect flashing. Thus, the flashing operation serves to remove any of the heat of reaction which has been given up by the reactor effluent upon its contact with the hygroscopic agent and the heat of water sorption by the hygroscopic agent from the drying zone. The resulting flashed hygroscopic agent, containing not more than its original water content can then be recycled to the drying zone.

The hygroscopic material employed in the process of this invention includes sulfuric acid and the hygroscopic halides such as the halides of copper, lithium, calcium, rubidium, iron, magnesium, strontium, nickel, zinc, beryllium, cadmium, and cesium. Of this group, sulfuric acid, calcium chloride, calcium bromide and ferric chloride are preferred. Since the present process applies to the oxidation of hydrogen chloride, hydrogen bromide or hydrogen iodide, preferably hydrogen chloride, to the corresponding halogen gas, it is to be understood that hygroscopic agent chosen for use in a given system should also correspond to the halide reactant. It should also be undersood that the drying of the reactor effluent gas can be performed in one or more stages using one or more of the hygroscopic materials listed above. Thus, for example, in a process wherein hydrogen chloride is oxidized to chlorine, the gaseous effluent containing chlorine, hydrogen chloride, water and oxygen can be dehydrated in a first drying zone with sulfuric acid under the conditions outlined above, preferably for the removal of a major portion of the water, and then passed to one or more subsequent drying operations employing either sulfuric acid or some hygroscopic halide such as calcium chloride for more complete dehydration. In the preferred process for the production of chlorine, the gaseous reactor effluent should ultimately be dried to a water dew point of at least —30° F. and most preferably —50° F. before isolating chlorine product.

The water content of the hygroscopic agent chosen for the drying step or steps can vary depending upon the desired dew point of the effluent and the particular agent chosen, e.g., for a water dew point of about −30° F., calcium chloride containing between 60 and 75 weight percent water or sulfuric acid containing between about 10 and about 2 weight percent water are suitably employed in the present process. The concentration also depends upon the amount of water absorption required for a particular drying stage. Thus, when employing a plurality of drying steps, it may be desirable to remove from about 60–85 percent of the water in the effluent in the first stage. For this purpose, more dilute solutions of the hygroscopic agent can be employed. For example, a sulfuric solution having a water concentration of 25 weight percent can be employed.

If desired, the effluent gas leaving the oxidation reaction zone can be cooled so that the entrance temperature of the gaseous effluent into the drying zone is substantially the same as the temperature at which it is withdrawn. However, since the oxidation is usually performed at high temperatures, and since the effluent, in cases where it is desirable to recover halogen gas, must be ultimately cooled to a temperature at which the halogen product is condensable, it is preferable to pass the reactor effluent gas directly into the drying zone for cooling by direct heat exchange in contact with the hygroscopic agent, thus eliminating corrosion problems associated with expensive heat exchange equipment. Therefore, in the preferred cases when the drying zone functions also as a cooling zone, all, or part of the flashed, regenerated hygroscopic agent is cooled to a temperature below the temperature of the dried effluent gas leaving the drying zone before the regenerated hygroscopic agent is recycled to the drying zone and the duty on the cooler in this stage of the process is determined by the heat difference between the entering wet effluent and the dry effluent exiting from the dryer. As a typical example, an effluent gas containing hydrogen chloride, chlorine, water and oxygen is preferably introduced into the lower portion of a drying tower at a temperature of about 850° F. and the resulting, dried effluent is removed from the top of the tower at a temperature of about 400° F., therefore, the gases have been cooled 450 degrees Fahrenheit, which heat next to the heat of sorption, has been taken up by the hygroscopic solution. This heat is partially dissipated in flashing and the remaining heat is removed by the cooler to provide a driving force to the drying operation. When no cooler is used, the effluent gases exit at approximately the same temperature as they are at inlet. It is also possible to remove heat by injection of water into the recycling hygroscopic solution, preferably between the drying zone and the evaporator. The extra evaporation, so caused, removes extra heat.

The adiabatic conditions referred to in this process describe the absorption and desorption of water by the hygroscopic agent before cooling. Thus, from the contact of dry sulfuric acid with wet effluent through the subsequent regeneration of the wet sulfuric acid in the flashing zone, the process is performed under adiabatic conditions which eliminates the use of costly and specially designed, acid-resistant heat exchange equipment. No heat is withdrawn in the drying stage and no heat is supplied for the regeneration of the acid, normally both costly steps. Since the hygroscopic agent, e.g., sulfuric acid in the flashing zone or zones, can be dehydrated to an extremely low water concentration, for example, below about 3 percent, the acid recycle cooler can be constructed of stainless steel and can be of simple design. Cooling water, or cold air, is preferably used to take the heat out.

The wet reactor effluent gaseous mixtures undergoing treatment in the process of the present invention are mixtures obtained from the catalytic conversion of a hydrogen halide, preferably hydrogen chloride or hydrogen bromide, to the corresponding halogen gas by reaction with oxygen or an oxygen-containing compound or a mixture such as air. In processes of this type, the reactor effluent containing unreacted hydrogen halide, the halogen gaseous product and water leaves the reaction zone at a temperature of between about 400° F. and about 900° F. under from about atmospheric to about 400 p.s.i.g., for gases containing chlorine gas and lower temperatures for gases containing bromine. The partial pressure of water in the reactor can vary from as low as 0.2 atmosphere in systems using air as the oxidizing agent up to about 200 p.s.i.g. when molecular oxygen is the oxidizing agent. Because of the high temperatures required for oxidation, the substantial sensible heat of reactor effluent gases can be used to provide energy for the dehydration of the wet hygroscopic agent in a later stage of the process by simple flashing. The temperature of oxidation depends largely on the decomposition temperature of the particular catalyst used. For example when chromium sesquioxide is charged to the reactor as the catalyst, an oxidation temperature of from about 800° F. to about 900° F. is preferably employed; whereas when copper containing catalysts are employed, an oxidation temperature of from about 600° F. to about 800° F. is preferred. Other suitable catalysts useful in this oxidation reaction include iron-containing catalysts.

Generally the effluent gases entering the contactor which comprise unconverted hydrogen halide, water and a substantial amount of halogen gas, has a water content varying between about 10 weight percent and about 20 weight percent. The wet effluent can be totally or partially dried depending upon whether or not it is desirable to recover halogen from the mixture, in one or several stages. When halogen is separated from the components of the mixture, the wet effluent is dried in one or more stages to a water dew point of at least 0° F. with the hygroscopic agent, preferably sulfuric acid, in at least the first stage when a plurality of drying steps are employed. In a subsequent stage or stages, the effluent is dried to a water dew point of at least −30° F., preferably −50° F., before separating halogen by condensation. The hygroscopic agent employed in the separate drying stages can be the same or a different material. However, use of the same hygroscopic agent throughout allows for a more simple regeneration of spent hygroscopic solution, since the solutions from the various drying stages can be combined and regenerated as a single solution, unless it is desirable to maintain different concentrations of solutions in the various drying stages. However, sometimes even in this case, namely when these concentrations are not too far apart, the combined solutions can be subjected to a common dehydration step followed by further dehydration of portions of the partially regenerated solution to a desired concentration for recycle. Alternatively, separate regeneration zones for each concentration desired can be employed. It is to be understood that when different hygroscopic agents are used in various drying stages, separate regeneration of the spent solution is recommended.

The drying operation is most advantageously performed in a packed tower resistant to attack by the hygroscopic agent used, for example, a tower packed with ceramic saddles, Raschig rings or similar material to provide better contact and increase the drying efficiency of the hygroscopic agent. The effluent gas is advantageously introduced into the bottom of the tower while the hygroscopic agent is introduced from above to provide countercurrent contact of effluent with hygroscopic agent. The contacting zone or zones can be operated within a broad range of temperatures and pressures depending, among other things, upon choice of hygroscopic agent, its concentration, and the desired depth of drying. Generally, when drying a chlorine-containing effluent gas mixture to a water dew point to −50° F. or below in a single zone with sulfuric acid, the contacting zone is most preferably operated at a temperature not higher than about 500° F. under a pressure of from atmospheric to about 500 p.s.i.g. The temperature in the contacting zone can be controlled between narrow limits by a recycle sulfuric acid stream hereinafter described, which has been cooled to a temperature below the temperature of the dried effluent leaving the zone to compensate for the heat of sorption of the sulfuric acid and any heat of reaction given up by the effluent gases during the drying operation. Temperature below about 200° F. are preferably employed for recycle sulfuric acid.

The sulfuric acid containing sorbed water leaving the contacting zone may contain small quantities of halogen product and/or hydrogen halide. If desired, these halogen-containing gases may be stripped with oxygen at about the same partial pressure of water as is present in the sulfuric acid mixture. This operation is preferably carried out by countercurrent contact of the liquid acid stream with oxygen at the temperature at which the liquid acid is removed from the contacting zone.

Although continuous withdrawal and recycle of the hygroscopic agent in the drying zone is preferred, it is also possible to operate this zone in a semi-batchwise manner. In a semi-batch operation, or pulsating type operation, when the hygroscopic agent becomes spent and has removed 1–2 percent its weight of water, the drying agent is withdrawn from the contacting or drying zone and passed to a regeneration or dehydration system which comprises one or more flashing zones in which adiabatic conditions are employed. At the relatively small water pick-up tolerable in adiabatic operation, this leads to a pulsating operation with variations in flow rate, water vapor developed, levels of liquid in the different vessels and other drawbacks. The continuous operation, again, is preferred. The vapor pressure of water in the flashing zone can vary between 1 mm. Hg up to about 5 atmospheres or above, depending upon the partial pressure of water in the oxidation reactor. In the case of drying the reactor effluent gases to a −30° F. water dew point and cooling with sulfuric acid, the partial pressure of water in the flashing zone is preferably between 15 and 60 mm. Hg.

In the dehydration zone, at least the water of sorption is withdrawn from the hygroscopic solution and from the dehydration zone or regeneration zone under reduced pressure, preferably maintained by a barometric condenser wherein the water withdrawn from the dehydration zone is condensed. One or more steam jet ejectors are attached to the condenser to remove non-condensables such as, for example, nitrogen which enters the system in the oxygen feed. These ejectors prevent the build-up of back pressure in the condenser. In some instances, as for example when multi-stage drying of reactor effluent is employed, wherein the concentration of the hydroscopic material in solution varies in the different stages, multi-stage dehydration or single stage dehydration of the hygroscopic solution can be effected to remove the sorbed water and, additionally, some of the water in the original solution may be removed to provide more concentrated solutions upon recycle. When multi-stage dehydration of the same hygroscopic solution from a single or multi-stage drying operation is effected, it is preferable to remove at least 85 weight percent of the sorbed water in the first flashing operation.

The effluent gases from the reactor which are dried in the contacting zone and which undergo cooling before or during the course of drying, are withdrawn, further pressurized, if so desired, and subjected to further cooling to condense the halogen product. The cooled, dried halogen product is then recovered from the mixture and the uncondensed gas is preferably recycled to the reactor to be combined with fresh feed hydrogen halide and oxygen or oxygen-containing gas.

It is to be understood that in the case of the use of sulfuric acid, the apparatus employed in the drying and dehydration stages must be of an acid resistant type. Ceramic or structural glass-lined units have been found to be suitable for this purpose as well as brick-lined vessels.

For a better understanding of the present invention, reference is had to the accompanying drawing which illustrates one embodiment of the present process but which is not to be construed in any way limiting to the scope of the present invention.

In the drawing about 2,100 pounds per hour of hydrogen chloride feed is passed through line 2 and into oxidation zone 4 which has been charged with chromia on alumina as the catalyst and which is operated as a fluid bed. The hydrogen chloride feed is supplemented with a recycle stream from line 6, hereinafter described. 500 pounds per hour of oxygen is also introduced into oxidation zone 4 from feed line 8.

The conversion of hydrogen chloride to chlorine per pass in zone 4 is about 70 percent (with recycle a 98.5 percent conversion) and the effluent gases are passed upwardly through solid separating means such as grids, cyclones 3 and/or internal or external filters before being introduced into drying zone 10 by means of line 9. The gaseous effluent containing 22.77 weight percent oxygen, 9.96 weight percent water, 17.28 weight percent hydrogen chloride, and 48.50 weight percent chlorine gas enters zone 10 at a temperature of about 850° F. under 55 p.s.i.g. The gas is contacted countercurrently with 93 percent sulfuric acid introduced from valved line 14 at a rate of 18,700 pounds per hour and the sulfuric acid coming down from the zone above in the first of two horizontally disposed beds packed with Raschig rings. As the effluent is dried and continues to rise through zone 10, it is cooled by contact with sulfuric acid and and passes to the second of the contact beds packed with Raschig rings for countercurrent contact with sulfuric acid entering zone 10 at a temperature of 110° F. and at a rate of about 5,600 pounds per hour through valved line 12. The dried effluent is then passed through demister pad 16 and withdrawn at a rate of 4,835 pounds per hour from the drying zone by means of line 18. Its water dew point then is about −50° F. This dried effluent contains 25.27 weight percent oxygen; 19.18 weight percent hydrogen chloride, and 53.90 weight percent chlorine, the remainder being nitrogen, inert gases, and residual water.

The sulfuric acid, 24,800 pounds per hour, containing sorbed water and having an acid concentration of 91 percent, is withdrawn from the lower portion of zone 10 at 480° F. by means of line 20 and passed to dehydrating zone 22 wherein the sulfuric acid is adiabatically flashed at a temperature of about 400° F. under about 74 mm. mercury and the resulting water vapor is passed through a silicone treated glass wool demister pad 24 and out of the dehydrating zone to the barometric condenser 26 wherein 536 pounds per hour of the vapors from line 28 are condensed. The water vapors are condensed in zone 26 at a temperature of 100° F. under vacuum with water at 85° F. and the uncondensables such as nitrogen and oxygen, are withdrawn from zone 26 by means of line 30 and passed to steam jet 32 by which they are swept out of the system and vented to the atmosphere by means of steam entering at 100 p.s.i.g.

The sulfuric acid which has been reconcentrated to 93 percent in zone 22 is withdrawn by means of line 34 and pumped through line 36 together with fresh sulfuric acid feed of at least 93 percent concentration entering line 36 from line 38 to provide a sulfuric recycle stream of 24,300 pounds per hour. A portion (about 75 percent) of the resulting concentrated sulfuric acid is then recycled to the drying zone 10 above the first packed contacting bed by means of valved line 14; while the remaining portion is passed through cooler 40 wherein the temperature of the concentrated sulfuric acid is lowered to 110° F. by indirect heat exchange with water at 85° F. This cooled portion of concentrated sulfuric acid is then recycled to drying zone 10 at a point above the second packed contacting bed by means of valved line 12.

The dried and cooled effluent is passed from line 18 through heat exchanger 42 and is pressured to 260 p.s.i.g. and a temperature of 283° F. in compressor 43. This material is then cooled to −3° F. in cooler 45 and passed into separation zone 44 wherein, at a temperature of −3° F., under a pressure of 257 p.s.i.g., the liquified chlorine product is separated from the remaining vapor. This vapor from zone 44 is passed through line 46 through indirect heat exchanger 42 in indirect heat exchange with the dried effluent and recycled to the reactor by means of line 6. In this manner, 1200 pounds per hour of oxygen and 900 pounds per hour of hydrogen chloride are returned to the reactor, together with a trace amount of product and some inert materials.

*Example*

In an organic chlorination plant about 58 pound mols per hour of gaseous chlorine are reacted with an organic compound, producing an organic chloride and about 58 pound mols per hour of hydrogen chloride. This hydrogen chloride becomes the feed to a 24 ton per day chlorine plant. The combined feed to the oxidation reactor comprises a ratio of 4 pound mols of hydrogen chloride to 2 pound mols of oxygen gas which are reacted at a temperature of 850° F. under 80 p.s.i.g. in the presence of chromium oxychloride catalyst deposited on a suitable carrier such as alumina. Seventy-five pound mols of hydrogen chloride per hour are injected into the reactor. A 75 percent conversion of hydrogen chloride to chlorine gas is obtained and the effluent removed from the reactor contains 1.0 pound mol of hydrogen chloride, 1.25 pound mols of oxygen, 1.84 pound mols of chlorine and 1.50 pound mols of water at a temperature of 850° F. A 20 pounds per square inch partial pressure of oxygen is maintained over the catalyst during reaction to maintain catalyst activity.

The off gases from the reactor are injected into the bottom of a ceramic-lined tower packed with ceramic saddles. The gas is contacted countercurrently with 93 percent sulfuric acid introduced at a rate of about 18,800 pounds per hour and the sulfuric acid coming down from the zone above in the first of two packed beds. As the effluent is dried and continues to rise through the lower bed, it is cooled by contact with sulfuric acid and passes to the second of the contact beds for countercurrent contact with 93 percent sulfuric acid entering the latter bed at a temperature of 110° F. and at a rate of about 4,500 pounds per hour. At this temperature and acid concentration, the partial pressure of water is 0.016 mm. Hg. The sulfuric acid after countercurrent contact with the effluent gases is withdrawn from the tower at a concentration of about 91 weight percent. The heat loss from the effluent to the sulfuric acid sorption medium and the heat of sorption result in the 91 percent by weight sulfuric acid solution being withdrawn at a temperature of 460° F. The corresponding water partial pressure in the liquid sulfuric acid withdrawn is about 360 mm. mercury. The wet sulfuric acid solution is then passed to a ceramic-lined flashing zone wherein, under a pressure of 78 mm. under adiabatic conditions, about 90 percent by weight of the sorbed water is removed as vapor. The resulting sulfuric acid at a temperature of about 400° F., having a concentration of about 92.8 weight percent is then passed to a second flashing zone wherein under a pressure of 29 mm. under adiabatic conditions, the remaining 10 percent of sorbed water is removed as a vapor. Part (e.g. 10 to 40 percent, e.g., 20 percent) of the resulting flashed sulfuric acid having a concentration of about 93 weight percent is then passed at a temperature of 350° F. to a cooling zone wherein the temperature of the concentrated sulfuric acid is reduced to about 110° F., and the cooled material is then recycled to the drying zone. The low temperature acid affords more complete drying of effluent in the upper portion of the drying zone or tower.

The water in admixture with inert gases such as nitrogen and oxygen, removed from the sulfuric acid is passed to a barometric condenser wherein the water is condensed under about 50 mm. Hg maintained by three steam ejectors which continually remove the inerts from the system, the vapor from the second flash stage first being pressured to 50 mm. Hg.

The dried reactor effluent removed from the top of the drying column after being pressured to 260 p.s.i.g. is subjected to cooling to a temperature of −3° F. by contacting indirectly with a chlorine stream at −18° F. later described herein. The liquid chlorine product in about 98 percent yield is separated from the uncondensed gases which are recycled to the reactor after recovery of their inherent refrigeration capacity. The recovered liquid chlorine is combined with about the same amount of fresh feed chlorine, necessary for the organic chlorination plant, and flashed to give a mixture of liquid and gaseous chlorine at about −18° F. which is used as the refrigerant for condensation of the recovered chlorine. The resulting 58 pound mols per hour of gaseous chlorine are then used for the organic chlorination reaction.

Having thus described our invention we claim:

1. In a process wherein a halogen gas is produced by the oxidation of a hydrogen halide and an effluent gas containing water, hydrogen halide and halogen is produced, the improvement for treating the effluent which comprises: drying the effluent with an aqueous solution of a hygroscopic agent selected from the group consisting of a hygroscopic metal halide and sulfuric acid under adiabatic conditions to increase the temperature of the hygroscopic solution by heat of sorption and any heat of reaction from the effluent gas, dehydrating the hygroscopic solution containing sorbed water under diminished pressure and adiabatic conditions by flashing using the increased heat content of the solution as the driving force for the flashing, recycling the resulting hygroscopic solution from which at least sorbed water has been dehydrated to the drying zone, and recovering dried effluent gas from the drying zone.

2. In a process wherein chlorine gas is produced by the oxidation of a hydrogen chloride and an effluent gas containing water, hydrogen chloride and chlorine is produced, the improvement for treating the effluent which comprises: drying the effluent with an aqueous solution of a hygroscopic agent selected from the group consisting of a hygroscopic metal chloride and sulfuric acid under adiabatic conditions to increase the temperature of the hygroscopic solution by heat of sorption and any heat of reaction from the effluent gas, dehydrating the hygroscopic solution containing sorbed water under diminished pressure and adiabatic conditions by flashing using the increased heat content of the solution as the driving force for the flashing, recycling the resulting hygroscopic solution from which at least sorbed water has been dehydrated to the drying zone, recovering effluent gas dried to a water dew point of less than −30° F. from the drying zone, and recovering chlorine product from the dried effluent gas by condensation.

3. In a process wherein chlorine gas is produced by the oxidation of a hydrogn chloride and an effluent gas containing water, hydrogen chloride and chlorine is produced, the improvement for treating the effluent which comprises: drying the effluent in a plurality of separate drying zones to a water dew point of less than −30° F. with an aqueous solution of a hygroscopic agent selected from the group consisting of a hygroscopic metal chloride and sulfuric acid under adiabatic conditions to increase the temperature of the hygroscopic solutions in the drying zones by heat of sorption and heat of reaction from the effluent gas, dehydrating the hygroscopic solution containing sorbed water under diminished pressure and adiabatic conditions by flashing using the increased heat content of the solutions as the flashing temperature, recycling the resulting hygroscopic solution from which at least sorbed water has been dehydrated to the respective drying zone, recovering effluent gas dried to a water dew point of less than −30° F. from the final drying zone and recovering chlorine product from the dried effluent gas by condensation.

4. The process of claim 3 wherein the same hygroscopic agent is used in each of the drying zones and the concentration of the hygroscopic agent in solution increases in the successive zones and the hygroscopic agent withdrawn from each of the drying zones is separately flashed to eliminate sorbed water and recycled to its respective drying zone at the original concentration of the hygroscopic agent.

5. The process of claim 4 wherein different hygroscopic agents are used in the drying zones and the different hygroscopic solutions are separately withdrawn and separately flashed to eliminate sorbed water.

6. In a process wherein chlorine gas is produced by the oxidation of a hydrogen chloride in the presence of an oxidation catalyst and an effluent gas containing water, hydrogen chloride and chlorine is produced, the improvement for treating the effluent which comprises: drying and cooling the effluent in a single drying zone to a water dew point of about $-50°$ F. by countercurrent contact with an aqueous solution of sulfuric acid under adiabatic conditions to increase the temperature of the hygroscopic solution by heat of sorption and by heat of reaction from the effluent gas, dehydrating the hygroscopic solution containing sorbed water under diminished pressure and adiabatic conditions by flashing using the increased heat content of the solution as the driving force for the flashing, withdrawing dried effluent gas from the drying zone, cooling the flashed sulfuric acid solution to a temperature below the temperature at which the dried effluent is withdrawn from the drying zone, recycling the resulting hygroscopic solution from which at least sorbed water has been dehydrated to the drying zone, and recovering chlorine product from the dried effluent gas by condensation.

7. In a process wherein a halogen gas is produced by the oxidation of a hydrogen halide and an effluent gas containing water, hydrogen halide and halogen is produced, the improvement for treating the effluent which comprises: in a drying zone, drying and cooling the effluent to a temperature of at least half the difference between the effluent entering the drying zone and the condensation temperature of the halogen at atmospheric pressure with aqueous solution of a hygroscopic agent selected from the group consisting of a hygroscopic metal halide and sulfuric acid under adiabatic conditions to increase the temperature of the hygroscopic solution by heat of sorption and by heat of reaction from the effluent gas, recovering dried effluent gas from the drying zone, dehydrating the hygroscopic solution containing sorbed water under diminished pressure and adiabatic conditions by flashing using the increased heat content of the solution as the driving force for the flashing, cooling the flashed hygroscopic solution to a temperature below the temperature of the dried effluent gas leaving the drying zone, and recycling the resulting cooled hygroscopic solution to the drying zone.

8. The process of claim 7 wherein additional cooling of the effluent is imparted by the recycling hygroscopic solution by injecting water into the solution withdrawn from the drying zone prior to flashing to effect additional evaporative cooling.

9. In a process wherein the chlorine gas is produced by the oxidation of a hydrogen chloride in the presence of an oxidation catalyst and an effluent gas containing water, hydrogen chloride and chlorine is produced, the improvement for treating the effluent which comprises: countercurrently contacting the effluent introduced into the lower portion of a drying zone packed with acid-resistant contact material with an aqueous solution of sulfuric acid, cooling and drying the effluent in the drying zone under adiabatic conditions to a water dew point of less than $-30°$ F., recovering dried effluent gas from the drying zone, passing sulfuric acid having an increased heat content and containing sorbed water to a dehydrating zone, flashing at least the sorbed water from the sulfuric acid in the dehydration zone under adiabatic conditions and reduced pressure to restore at least the original concentration of the acid, cooling at least a portion of the reconcentrated sulfuric acid to a temperature below the temperature of the dried effluent leaving the drying zone and recycling said cooled, dehydrated sulfuric acid to the upper portion of said drying zone, recovering chlorine from the dried effluent removed from the upper portion of the drying zone by pressurizing the effluent and condensing the chlorine product from the uncondensed hydrogen chloride in the effluent, recycling uncondensed hydrogen chloride to the oxidation zone as part of the feed thereto and recovering chlorine as the product of the process.

10. The process of claim 9 wherein a portion of the reconcentrated sulfuric acid is cooled and recycled to the upper portion of the drying zone and the remaining uncooled portion of the reconcentrated sulfuric acid is recycled to the drying zone at a point below introduction of said cooled portion and above the introduction of said effluent.

11. In a process wherein chlorine gas is produced by the oxidation of hydrogen chloride and an effluent gaseous mixture containing water, unreacted hydrogen chloride and chlorine is produced, the improvement for treating the gaseous effluent which comprises: passing the effluent gas into the bottom portion of a drying zone; introducing a first aqueous sulfuric acid solution into the middle portion of the drying zone; passing said gaseous effluent upwardly from the bottom portion through the middle portion of said drying zone in countercurrent contact with a first aqueous sulfuric acid solution containing less than 25 weight percent water; passing the effluent gas to the upper portion of said drying zone in countercurrent contact with a second, more concentrated aqueous solution of sulfuric acid; drying the effluent gas to a water dew point of at least $-30°$ F. and cooling the gas in said drying zone; recovering substantially dry effluent gas from said drying zone; withdrawing a portion of the sulfuric acid solution from the bottom of the drying zone after contact with the effluent gas; adiabatically flashing said portion of sulfuric acid solution for recycle as the second more concentrated aqueous sulfuric acid solution in the upper portion of said drying zone; withdrawing the remaining portion of sulfuric acid solution after contact with the effluent gas from a point in said drying zone between the withdrawal of the first mentioned portion and the introduction of said first aqueous sulfuric acid solution; cooling said remaining portion of sulfuric acid solution and recycling said cooled solution to the middle portion of said drying zone as said first sulfuric acid solution.

12. The process of claim 11 wherein an aqueous hydrogen chloride solution containing less than 20 weight percent water is admixed with reactor effluent gas, the resulting mixture dried in said drying zone to a water dew point of less than $-30°$ F., the chlorine gas is separated from the dried mixture and the hydrogen chloride of the dried mixture is recycled to the oxidation zone as at least a part of the feed thereto.

13. The process of claim 11 wherein an aqueous hydrogen chloride solution containing in excess of 20 weight percent water is vaporized and contacted with sulfuric acid solution to reduce the water content below 20 weight percent, the partially dried hydrogen chloride feed is admixed with reactor effluent gas, the resulting mixture dried in said drying zone to a water dew point of less than $-30°$ F., the chlorine gas is separated from the dried mixture and the hydrogen chloride of the dried mixture is recycled to the oxidation zone as at least a part of the feed thereto.

14. In a process wherein chlorine gas is produced by the oxidation of hydrogen chloride and an effluent gaseous mixture containing water, unreacted hydrogen chloride and chlorine is produced, the improvement for treating the gaseous effluent which comprises: passing the effluent gas into the bottom portion of a drying zone; introducing a first aqueous sulfuric acid solution into the middle portion of the drying zone; passing said gaseous effluent upwardly from the bottom portion through the middle portion of said drying zone in countercurrent contact with a first aqueous sulfuric acid solution containing less than 25 weight percent water; passing the effluent gas to the upper portion of said drying zone in countercurrent contact with a second, more concentrated aqueous solution of sulfuric acid; drying the effluent gas to a water dew point of at least −30° F. and cooling the gas in said drying zone; recovering substantially dry effluent gas from said drying zone; withdrawing a portion of the sulfuric acid solution from the bottom of the drying zone after contact with the effluent gas; flashing the withdrawn solution and recycling to the middle portion of said drying zone as said first sulfuric acid solution at its original concentration; withdrawing the remaining portion of sulfuric acid solution after contact with the effluent gas from a point in said drying zone between the withdrawal of the first mentioned portion and the introduction of said first aqueous sulfuric acid solution; adiabatically flashing said remaining portion of sulfuric acid solution to the original concentration of said second aqueous sulfuric acid solution and recycling said remaining portion of sulfuric acid solution to the upper portion of the drying zone as said second more concentrated aqueous sulfuric acid solution.

References Cited by the Examiner

UNITED STATES PATENTS

| 2,395,314 | 2/46 | Blumer | 23—219 |
| 2,542,961 | 2/51 | Johnson | 23—219 |
| 2,878,105 | 3/59 | Walter | 23—219 |

FOREIGN PATENTS 764,401   12/56   Great Britain.

MAURICE A. BRINDISI, *Primary Examiner.*